United States Patent
Abdelsamie et al.

(10) Patent No.: US 9,389,638 B2
(45) Date of Patent: Jul. 12, 2016

(54) DEVICE FOR DETECTING A CARRYING CASE

(71) Applicant: RESEARCH IN MOTION LIMITED, Waterloo (CA)

(72) Inventors: Ahmed Abdelsamie, Nepean (CA); Marc Elis Meunier, Kitchener (CA); Omar George Joseph Barake, Waterloo (CA); Steven Anthony Lill, Waterloo (CA); Guowei Zhang, Kitchener (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 381 days.

(21) Appl. No.: 13/911,235

(22) Filed: Jun. 6, 2013

(65) Prior Publication Data

US 2014/0361876 A1 Dec. 11, 2014

(51) Int. Cl.
*H04Q 5/22* (2006.01)
*G06F 1/16* (2006.01)
*H04W 4/00* (2009.01)

(52) U.S. Cl.
CPC ........ *G06F 1/16* (2013.01); *H04W 4/008* (2013.01)

(58) Field of Classification Search
CPC .................. G06K 7/10366; G06K 1/1628
USPC ..................... 340/10.1, 505, 517
See application file for complete search history.

(56) References Cited

U.S. PATENT DOCUMENTS

| | | |
|---|---|---|
| 5,517,183 A | 5/1996 | Bozeman, Jr. |
| 6,532,001 B1 | 3/2003 | Taraki et al. |
| 8,170,621 B1 | 5/2012 | Lockwood |
| 8,290,480 B2 | 10/2012 | Abramson et al. |
| 2001/0024967 A1 | 9/2001 | Bauer |
| 2004/0074966 A1 | 4/2004 | Holzer |
| 2005/0227750 A1 | 10/2005 | Brase et al. |
| 2007/0182710 A1 | 8/2007 | MacDonald et al. |
| 2007/0274563 A1 | 11/2007 | Jung et al. |
| 2008/0130417 A1 | 6/2008 | Bhavnani |
| 2008/0218493 A1 | 9/2008 | Patten et al. |
| 2008/0255795 A1 | 10/2008 | Shkolnikov |
| 2009/0146962 A1 | 6/2009 | Ahonen et al. |
| 2009/0219166 A1 | 9/2009 | MacFarlane et al. |
| 2011/0190953 A1 | 8/2011 | Park et al. |
| 2012/0221290 A1 | 8/2012 | Oka et al. |

(Continued)

FOREIGN PATENT DOCUMENTS

| | | |
|---|---|---|
| DE | 202012011370 U1 | 1/2013 |
| EP | 1959332 A1 | 8/2008 |

(Continued)

OTHER PUBLICATIONS

Corresponding European Patent Application No. 13170915.6 Search Report dated Nov. 29, 2013.

(Continued)

*Primary Examiner* — Vernal Brown
(74) *Attorney, Agent, or Firm* — Perry + Currier, Inc.

(57) ABSTRACT

A device for detecting a carrying case, and methods there for, are provided. The device includes: an orientation sensor; a near field communication (NFC) reader; and, a processor configured to place the device in a carrying case mode when an orientation of the device is within a given angular range as determined using the orientation sensor, and the NFC reader detects an NFC tag.

14 Claims, 4 Drawing Sheets

(56) References Cited

U.S. PATENT DOCUMENTS

| | | |
|---|---|---|
| 2012/0259578 A1* | 10/2012 | Bevilacqua et al. .......... 702/141 |
| 2012/0265482 A1 | 10/2012 | Grokop et al. |
| 2012/0290257 A1 | 11/2012 | Hodge et al. |
| 2013/0040560 A1* | 2/2013 | Kennedy et al. ............. 455/41.1 |
| 2013/0117153 A1 | 5/2013 | Shen |
| 2013/0269798 A1 | 10/2013 | Wood |
| 2014/0152818 A1 | 6/2014 | Na et al. |
| 2014/0184471 A1 | 7/2014 | Martynov et al. |
| 2014/0187256 A1 | 7/2014 | Modali et al. |
| 2014/0204017 A1 | 7/2014 | Wu |

FOREIGN PATENT DOCUMENTS

| | | |
|---|---|---|
| EP | 2261767 A2 | 12/2010 |
| EP | 2474878 A1 | 7/2012 |
| EP | 2487884 A1 | 8/2012 |
| WO | 2011163350 A1 | 12/2011 |

OTHER PUBLICATIONS

Related European Patent Application No. 13170934.7 Search Report dated Nov. 20, 2013.

Correction of NPL document submitted in IDS filed on Jun. 6, 2013 U.S. Appl. No. 13/891,420, filed May 10, 2013 Title: A Device for Providing Notifications While Mated With a Carrying Case Inventors: Abdelsamie et al.

U.S. Appl. No. 13/391,420, filed May 10, 2013 Title: A Device for Providing Notifications While Mated With a Carrying Case Inventors: Abdelsamie et al.

Non-Final Rejection dated Dec. 17, 2014, issued on Related U.S. Appl. No. 13/911,899.

* cited by examiner

DEVICE FOR DETECTING A CARRYING CASE

FIELD

The specification relates generally to devices, and specifically to a device for detecting a carrying case.

BACKGROUND

The evolution of computers is currently quite active in the mobile device environment. Magnets in carrying cases are generally used by devices received therein to detect when the device is received in the carrying case via Hall effect sensors and the like. However, magnets are rapidly becoming prohibitively expensive.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
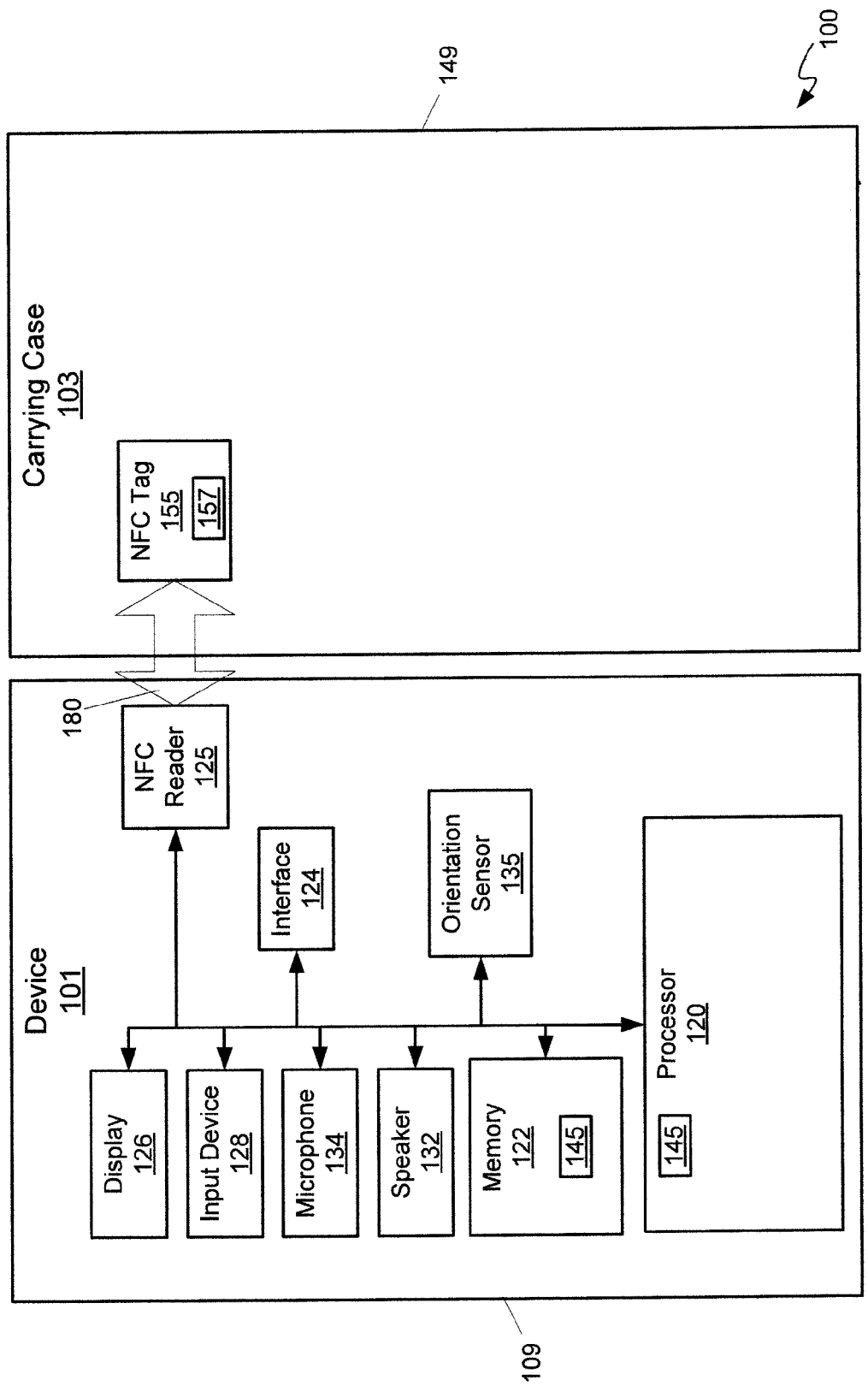
FIG. 1 depicts a schematic diagram of comprising a device and a carrying case, the device configured to detect the carrying case, according to non-limiting implementations.

In general, this disclosure is directed to a device, and in particular to a mobile electronic device, for use with a carrying case. In general, mobile electronic devices represent electronic devices that are readily movable from place to place. Such devices typically are placed into a carrying case mode when received in a carrying case. For example, carrying cases typically can include one or more magnets, such as rare earth magnets; however the cost of magnets, and especially rare earth magnets, is increasing as the demand for magnet materials, and especially rare earth magnet materials, is increasing, as is the cost of the rare earth metals used in their manufacture. Furthermore, the mining of rare earth metals can be harmful to the environment due to the use of aggressive acids in their extraction from the ground. Hence, eliminating magnets, and especially rare earth magnets, from carrying cases is desirable to reduce the cost of carrying cases and to provide an environmentally friendly (e.g. "green") product. However, detection of the carrying case by a device can then be challenging. This specification hence describes various implementations of a device that can detect a carrying case without the use of magnets.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as mated, coupled or connected physically, electronically, optically, communicatively, mechanically or any combination thereof, according to context. Hence, in this disclosure, "enabled to mate" refers to a communicative coupling and typically a physical coupling as well. In general, components that are communicatively coupled are configured to communicate (that is, they are capable of communicating) in any fashion for any duration, such as by way of electric signals, optical signals, wireless signals, or any combination thereof. The communication may be one-way or two-way communication. Components are "physically coupled" when they are attached or connected or joined to one another, in any fashion, whether releasably or substantially permanently, so that physical activity of one component generally affects the other. The physical attachment may be direct or by way of one or more intermediate elements. According to context, two components that are physically coupled may behave as a single element. In some cases, physically coupled elements may be integrally formed, e.g., part of a single-piece article that may share structures and materials. In other cases, physically coupled elements may comprise discrete components that may be fastened together in any fashion. Physical coupling may also include a combination of discrete components fastened together, and components fashioned as a single piece.

In this specification, elements may be described as "obscured" and/or "exposed". In general, an element that is obscured is one or more of not visible to a user, not viewable, covered, blocked, concealed, hidden, and the like. Similarly, an element that is exposed is one or more of visible to a user, uncovered, revealed, viewable, and the like.

An aspect of the specification comprises a device comprising: an orientation sensor; one or more of a near field communication (NFC) reader and a short range RF (radio-frequency) reader; and, a processor configured to place the device in a carrying case mode when: an orientation of the device is within a given angular range as determined using the orientation sensor, and the NFC reader and/or the short range RF (radio-frequency) reader detects one or more of an NFC tag and a short range RF tag.

The processor can be further configured to place the device in a carrying case mode when: the orientation of the device is within the given angular range for a given time period, and the NFC reader and/or the short range RF reader detects the NFC tag and/or the short range RF tag.

The processor can be further configured to turn on the NFC reader and/or the short range RF reader when the orientation of the device is within the given angular range for a given time period.

The carrying case mode can comprise one or more of: a sleep mode, a peek mode, and a quiet mode.

The processor can be further configured to: receive information from the NFC tag and/or the short range RF tag using the NFC reader and/or the short range RF reader; and, configure the carrying case mode based on the information.

The processor can be further configured to place the device in an out-of-carrying case mode when: the orientation of the device is no longer within the given angular range as determined using the orientation sensor, and the NFC reader and/or the short range RF reader no longer detects the NFC tag and/or the short range RF tag. The processor can be further configured to place the device in the out-of-carrying case mode when: the orientation of the device is no longer within the given angular range for a given time period, and the NFC reader and/or the short range RF reader no longer detects the NFC tag and/or the short range RF tag.

The given angular range can be one or more of: between about 70° and about 110°; between about −20° and about 20°; indicative of a horizontal orientation; and indicative of a vertical orientation.

The orientation sensor can comprise one or more of a gyroscope, an accelerometer, and a magnetometer.

Another aspect of the specification provides a method comprising: at a device comprising an orientation sensor, one or more of a near field communication (NFC) reader and/or the short range RF reader and a processor, placing, using the processor, the device in a carrying case mode when: an orientation of the device is within a given angular range as determined using the orientation sensor, and the NFC reader and/or the short range RF reader detects an NFC tag and/or a short range RF tag.

The method can further comprise placing, using the processor, the device in a carrying case mode when: the orientation of the device is within the given angular range for a given time period, and the NFC reader and/or the short range RF reader detects the NFC tag and/or the short range RF tag.

The method can further comprise turning on, using the processor, the NFC reader and/or the short range RF reader when the orientation of the device is within the given angular range for a given time period.

The carrying case mode can comprise one or more of: a sleep mode, a peek mode, and a quiet mode.

The method can further comprise: receiving information at the processor from the NFC tag and/or the short range RF tag using the NFC reader and/or the short range RF reader; and, configuring, using the processor, the carrying case mode based on the information.

The method can further comprise placing, using the processor, the device in an out-of-carrying case mode when: the orientation of the device is no longer within the given angular range as determined using the orientation sensor, and the NFC reader and/or the short range RF reader no longer detects the NFC tag and/or the short range RF tag. The method can further comprise placing, using the processor, the device in the out-of-carrying case mode when: the orientation of the device is no longer within the given angular range for a given time period, and the NFC reader and/or the short range RF reader no longer detects the NFC tag and/or the short range RF tag.

The given angular range can be one or more of: between about 70° and about 110°; between about −20° and about 20°; indicative of a horizontal orientation; and indicative of a vertical orientation.

The orientation sensor can comprise one or more of a gyroscope, an accelerometer, and a magnetometer.

Yet a further aspect of the specification provides a computer program product, comprising a computer usable medium having a computer readable program code adapted to be executed to implement a method comprising: at a device comprising an orientation sensor, one or more of a near field communication (NFC) reader and a short range RF reader and a processor, placing, using the processor, the device in a carrying case mode when: an orientation of the device is within a given angular range as determined using the orientation sensor, and the NFC reader and/or the short range RF reader detects an NFC tag and/or the short range RF tag. The computer usable medium can comprise a non-transitory computer usable medium. The method can further comprise placing, using the processor, the device in a carrying case mode when: the orientation of the device is within the given angular range for a given time period, and the NFC and/or the short range RF reader detects the NFC tag and/or the short range RF tag.

FIG. 1 depicts a system 100 comprising a device 101 and a carrying case 103, according to non-limiting implementations. Device 101 comprises a housing 109, which houses a processor 120 interconnected with a memory 122, a communications interface 124, one or more of an NFC reader 125 and a short range RF (radio-frequency) reader, a display 126, an input device 128, a speaker 132, a microphone 134, and an orientation sensor 135. Communications interface 124 will be interchangeably referred to as interface 124.

Carrying case 103 comprises: a body 149 configured to mate with device 101 (including but not limited to housing 109); and one or more of an NFC tag 155 and a short-range RF tag comprising information 157. In general, NFC reader 125 is configured to detect NFC tag 155 when device 101 is mated with carrying case 103. Furthermore, NFC reader 125 is configured to receive information 157 when NFC tag 155 is detected and/or as part of the mechanism for detecting NFC tag 155. Indeed, receipt of information 157 at NFC reader 125 can be indicative of detection of NFC tag 155.

It is further appreciated that processor 120 is generally configured to place device 101 in a carrying case mode when: an orientation of device 101 is within a given angular range as determined using orientation sensor 135, and NFC reader 125 detects NFC tag 155. Indeed, device 101 is generally configured to enter a carrying case mode when received in carrying case 103: for example, in some carrying case modes, processor 120 can control device 101 and/or components at device 101 to enter a sleep mode and/or turn off. Indeed, carrying case modes can include, but are not limited to, a sleep mode, a quiet mode, and a peek mode, in which display 126 and the like are controlled to provide notifications and the like at areas that are not obscured by carrying case 103, for example to provide notifications of events, including, but not limited to, receipt of a message (e.g. emails, text messages etc.), receipt of a phone call, a calendar event and/or a calendar event reminder as indicated in, for example, a calendar database, and the like. In general, a carrying case mode refers to the way or ways in which device 101 behaves or operates or responds or otherwise functions when it is in (or mated with) a carrying case, such as carrying case 103, as opposed to the way in which device 101 functions when device 101 is out of the carrying case. When device 101 is in the carrying case, device 101 can automatically disable or turn off or reduce some of its own functionality, for example; device 101 can also activate or change other functionality.

It is appreciated that FIG. 1 further depicts schematic diagrams of each of device 101 and carrying case 103, which will be hereafter be described in further detail.

It should be emphasized that the structures of device 101 and carrying case 103 in FIG. 1 are purely examples. For example, as depicted in FIG. 1, it is contemplated that device 101 comprises a device that can be used for implementing both wireless voice (e.g. telephony) and wireless data communications (e.g. email, web browsing, text, and the like), as well as any other specialized functions, including, but not limited, to one or more of, computing, and/or entertainment related functions.

Housing 109 can comprise any housing, casing, and the like. It is appreciated that device 101 can be portable (readily movable from place to place) and, in some implementations, device 101 can be handheld (sized and shaped to be held or carried in a human hand, and typically used while so held or carried); hence, housing 109 can be configured for a type of device 101. In general, housing 109 encloses or houses the components of device 101; however some components can be visible via apertures, windows and the like in housing 109. For example, display 126 is generally visible.

At least one input device 128 is generally configured to receive input data, and can comprise any suitable combination of input devices, including but not limited to a keyboard, a keypad, a pointing device, a mouse, a track wheel, a trackball, a touchpad, a touch screen and the like. Other input devices are within the scope of present implementations.

Input from input device 128 is received at processor 120 (which can be implemented as a plurality of processors, including but not limited to one or more central processors (CPUs)). Processor 120 is configured to communicate with a memory 122 comprising a non-volatile storage unit (e.g.

Erasable Electronic Programmable Read Only Memory ("EEPROM"), Flash Memory, and the like) and a volatile storage unit (e.g. random access memory ("RAM"), and the like). Programming instructions that implement the functional teachings of device 101 as described herein are typically maintained, persistently, in memory 122 and used by processor 120 which makes appropriate utilization of volatile storage during the execution of such programming instructions. In some implementations, processor 120 comprises at least a portion of memory 122, for example as on-board random access memory (RAM). It is further appreciated that memory 122 is an example of computer readable media that can store programming instructions executable on processor 120. Furthermore, memory 122 is also an example of a memory unit and/or memory module.

In particular, it is appreciated that memory 122 stores application 145, that, when processed by processor 120, enables processor 120 to place device 101 in a carrying case mode when: an orientation of device 101 is within a given angular range as determined using orientation sensor 135, and NFC reader 125 detects NFC tag 155, and/or a short range RF reader detects a short range RF tag. Application 145 can store the given angular range; alternatively, the given angular range can be stored at memory 122 separate from application 145. It is further appreciated that the term "given angular range" refers to a particular angular range, and/or an angular range of significance, for example, an angular range within which device 101 can be considered about horizontal or about vertical.

Processor 120 can be further configured to communicate with display 126, microphone 134 and speaker 132. Display 126 comprises any suitable one of, or combination of, CRT (cathode ray tube) and/or flat panel displays (e.g. LCD (liquid crystal display), plasma, OLED (organic light emitting diode), capacitive or resistive touch screens, and the like)). Microphone 134 comprises a microphone for receiving sound data at device 101. Speaker 132 comprises a speaker for providing sound data, audible alerts, audible communications from remote communication devices, and the like, at device 101. Processor 120 can also control one or more of display 126 and speaker 132 to provide notifications. In some implementations, device 101 can further comprise an indicator, for example an LED (light emitting diode), a light and the like that can also be configured to provide notifications.

Processor 120 also connects to NFC reader 125 and/or short range RF reader which is configured to wirelessly communicate with at least NFC tag 155 and/or a short range RF tag, as will be described below. In some implementations, NFC reader 125 comprises a near field communication (NFC) antenna and hence, in these implementations, NFC reader 125 comprises an NFC interface for wirelessly transmitting and receiving NFC signals via an NFC antenna. Indeed, in general, NFC reader 125 can include, but is not limited to, an NFC reader, an NFC antenna, a short range RF reader, a RFID (radio-frequency identifier) reader, and the like. In other words, while the term "NFC" can refer to a specific standard, present implementations are not so limited, and a device 101 can include any short range RF reader configured to detect corresponding short range RF tags. Indeed, hereafter the terms "NFC reader" and "short range RF reader" are interchangeable; furthermore, the terms "NFC tag" and "short range RF tag" are interchangeable.

Interface 124 (and/or another communications interface, not depicted) can be implemented as one or more radios and/or connectors and/or network adaptors, configured to wirelessly communicate with one or more communication networks (not depicted) and/or wireless communication networks and/or wired communication networks and/or wireless transceivers. It will be appreciated that, in these implementations, interface 124 can be configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, UMTS (Universal Mobile Telecommunications System), CDMA (Code division multiple access), WCDMA (Wideband CDMA), FDD (frequency division duplexing), TDD (time division duplexing), TDD-LTE (TDD-Long Term Evolution), TD-SCDMA (Time Division Synchronous Code Division Multiple Access) and the like, wireless data, Bluetooth™ links, NFC (near field communication) links, WiFi links, WiMax links, packet based links, the Internet, analog networks, the PSTN (public switched telephone network), access points, and the like, and/or a combination. When interface 124 is configured to communicate with one or more communication networks, interface 124 can comprise further protocol specific antennas there for (not depicted).

Orientation sensor 135 can comprise one or more of a gyroscope, an accelerometer, a magnetometer and the like. In particular, orientation sensor 135 is configured to determine an orientation of device 101, for example an angle of device 101 with respect to the ground and/or the earth and/or a magnetic field of the earth including, but not limited to, an angle indicative of device 101 being about vertical to the ground and an angle indicative of device 101 being about horizontal to the ground. Output of orientation sensor 135 can be received at processor 120 periodically by processor 120 requesting output from orientation sensor 135 and/or by orientation sensor 135 periodically pushing output to processor 120. Furthermore, while output of orientation sensor 135 is generally indicative of an angle of device 101 with respect to the ground, output of orientation sensor 135 need not comprise angular data (i.e. 0°, 90°, and the like); rather output of orientation sensor 135 can comprise one or more of current, a current value, a voltage, a voltage value and the like, indicative of an angle. Regardless, processor 120 can be configured to determine whether an orientation of device 101 is within a given angular range using the output of orientation sensor 135.

While not depicted, it is yet further appreciated that device 101 comprises a battery and/or a power pack, or any other suitable power source.

In any event, it should be understood that a wide variety of configurations for device 101 are contemplated.

Turning now to carrying case 103, carrying case 103 and/or body 149, is generally configured to mate with device 101 and/or housing 109. Carrying case 103 can hence comprise any suitable apparatus for carrying device 101, including, but not limited to, a holster, a sleeve, a sheath, a wallet, a folder, a portfolio, bag and/or other receptacle.

NFC tag 155 is generally located at carrying case 103 at a location where NFC tag 155 can be detected when device 101 is received in and/or mated with carrying case 103, as indicated by signals 180 exchanged there between in FIG. 1. NFC tag 155 can be located on an exterior wall of carrying case 103, on an interior wall of carrying case 103 and/or in a wall of carrying case 103. Information 157 can comprise data that identifies one or more of carrying case 103, a class of carrying case 103, a type of carrying case 103, and the like.

Furthermore NFC tag 155 is generally compatible with NFC reader 125; for example, when NFC reader 125 comprises an RFID reader, NFC tag 155 generally comprises an RFID tag. Furthermore, NFC tag 155 can comprise one or more of a passive NFC tag and an active NFC tag. When NFC tag 155 comprises a passive NFC tag, NFC tag 155 is generally powered from signals received from NFC reader 125.

When NFC tag 155 comprises an active NFC tag, carrying case 103 can further comprise a battery, a power pack and the like for powering the active NFC tag. However, in general, NFC tag 155 remains off until receiving a query from NFC reader 125, for example a query for information 157; NFC tag 155 responds to the query by one or more of entering a handshake sequence with NFC reader 125 and transmitting information 157 to NFC reader 125.

Figure 2:
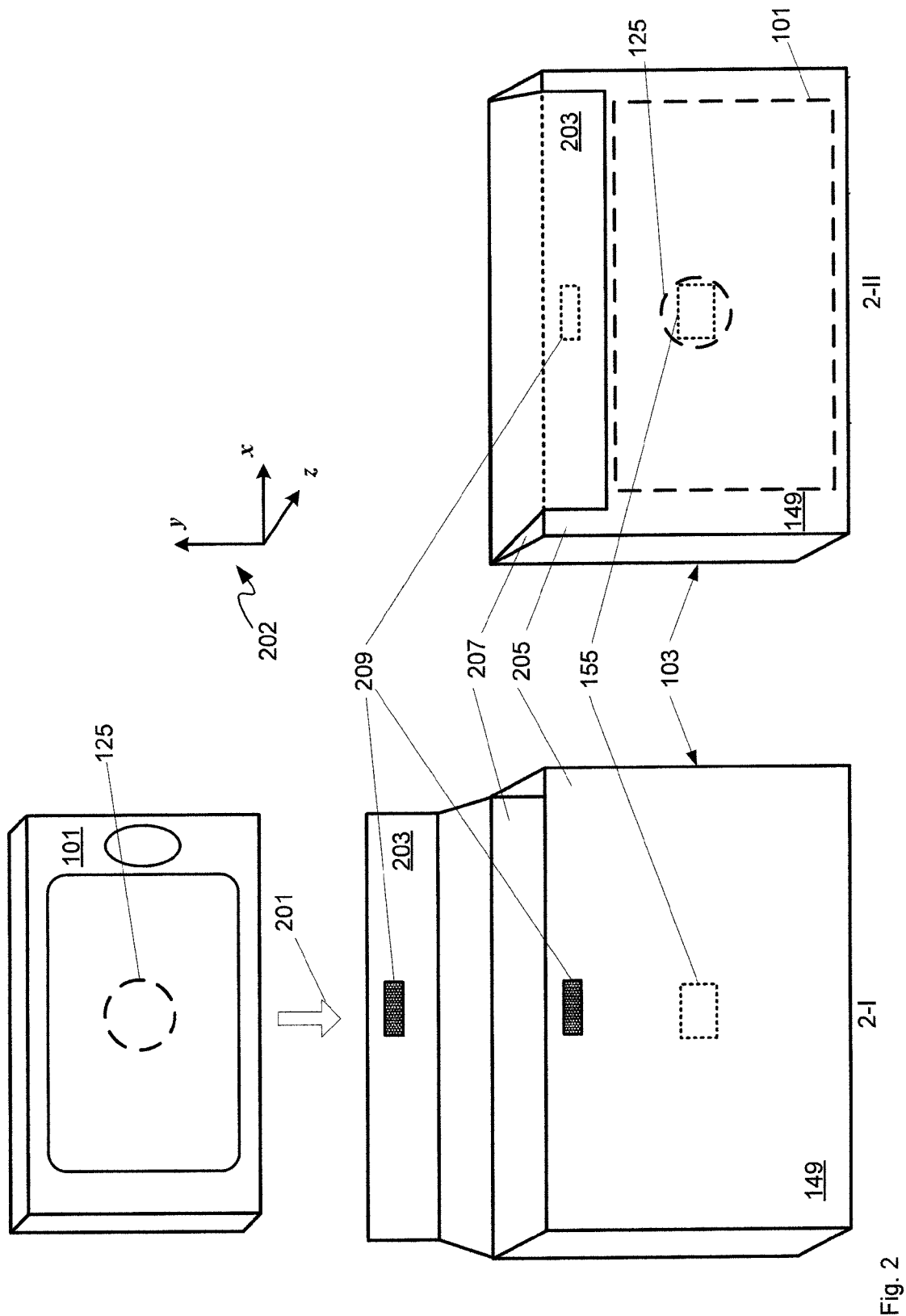
FIG. 2 depicts a sequence for mating the device of FIG. 1 to the carrying case of FIG. 1, as well as relative locations of components thereof, according to non-limiting implementations.

Attention is next directed to FIG. 2, which depicts perspective views 2-I, 2-II of a sequence in which device 101 is received in carrying case 103, according to non-limiting implementations. In view 2-I, device 101 is being received into carrying case 103 as indicated by arrow 201. FIG. 2 also includes a coordinate system 202 having an x-direction, a y-direction and a z-direction; it is appreciated that the z-direction is "out-of-the-page", while the x-direction and the y-direction are in the page, respectfully left/right (and/or about horizontal to the ground) and up/down and/or vertical to the ground. Hence, with respect to coordinate system 202, arrow 201 is in the y-direction; however, each of device 101 and carrying case 103 could be rotated by an angle with respect to any of the x-direction, y-direction and z-direction and device 101 could be received into carrying case 103 at the angle and/or along the x-direction or the z-direction. View 2-I further depicts a relative location of NFC reader 125 within device 101: specifically, in example implementations, NFC reader 125 is located in about a centre of device 101. Further, NFC reader 125 is depicted as circular, which is specifically indicative of a circular NFC antenna. NFC reader 125 is further depicted in stippled lines indicating that NFC reader 125 is generally located within device 101, and is not visible in a perspective view.

Furthermore, while device 101 is depicted from a front perspective view in FIG. 2, it is appreciated that NFC reader 125, and specifically the NFC antenna, can be located towards a rear side of device 101 such that signals are transmitted and received by NFC reader 125 via a rear side of device 101, for example signals 180.

Carrying case 103 is further appreciated to comprise a flap 203, a front wall 205, an opposing back wall 207, and side walls, including a bottom wall, joining front wall 205 to back wall 207. While each of front wall 205, back wall 207 and side walls are depicted as being joined to each other along an entirety of each joining edge, in other implementations, front wall 205, back wall 207 and side walls can be joined at only one or more portions of the joining edges. Further each of front wall 205, back wall 207 and side walls can comprise gaps, apertures and the like.

It is yet further appreciated that, in these implementations, carrying case 103 is closable via flap 203, however, in other implementations, carrying case 103 does not comprise a flap. Furthermore, flap 203 can be secured in a closed position via complementary devices 209 located at flap 203 and front wall 205, devices 209 comprising one or more of adhesives, hook and loop devices, Velcro™ and the like. Device 209 can be used in place of magnets.

FIG. 2 further depicts a relative location of NFC tag 155 at carrying case 103, and specifically at front wall of carrying case 103. NFC tag 155 is further depicted in stippled lines indicating that NFC tag 155 is generally located within carrying case 103, and is not visible in a perspective view. However, in some implementations NFC tag 155 can be located on an exterior wall of carrying case 103, for example an exterior of front wall 205, and can be visible. Further, in other implementations, NFC tag 155 can be located at back wall 207, for example, when NFC reader 125, and specifically the NFC antenna, is located towards a rear side of device 101 such that signals are transmitted and received by NFC reader 125 via a rear side of device 101, for example signals 180.

In yet further implementations, carrying case 103 can comprise more than one NFC tag 155, each NFC tag 155 located for detection by NFC reader 125 when device 101 is received in carrying case 103 in different orientations. For example, as depicted, device 101 could be received in carrying case 103 with display 126 facing towards front wall 205 or towards back wall 207, and/or with a top of device 101 oriented left or right, in each of the frontwards or backwards orientations. Hence, carrying case 103 can comprise a plurality of NFC tags 155 for detection by NFC reader 125 in each of these orientations. When NFC reader 125 is located at approximately a center of device 101, two NFC tags 155 can be used: one at front wall 205, and one at back wall 207 as each NFC tag 155 could be detected by NFC reader 125 in each of the left and right orientations. In yet further implementations, carrying case 103 can be configured such that device 101 is receivable in carrying case 103 in a single orientation with display 126 facing towards front wall 205; in these implementations, only one NFC tag 155 can be used.

Attention is next directed to view 2-II, showing device 101 received in carrying case 103 and flap 203 in a closed configuration. Hence, device 101 is depicted in stippled lines as, in these implementations, device 101 is not visible within carrying case 103 when received therein and flap 203 is in a closed configuration. However, in other implementations, a portion of device 101 can be visible when received within carrying case 103; in some of these implementations, a portion of device 101 can be visible when received within carrying case 103 and flap 203 is in a closed configuration. While not depicted in view 2-II, in yet further implementations, a portion of device 101 can be visible when received within carrying case 103 and flap 203 is in an open configuration.

From view 2-II, it is apparent that NFC reader 125 and NFC tag 155 are about aligned and/or located such that NFC reader 125 can detect NFC tag 155 when device 101 is received in carrying case 103 and/or device 101 is mated with carrying case 103. Hence, a location of NFC reader 125 at device 101 and a location of NFC tag 155 at carrying case 103 are complementary to one another.

While not depicted, it is appreciated that carrying case 103 can further comprise a clip for clipping carrying case 103 to one or more of a belt, clothing, a backpack, and the like.

Figure 3:
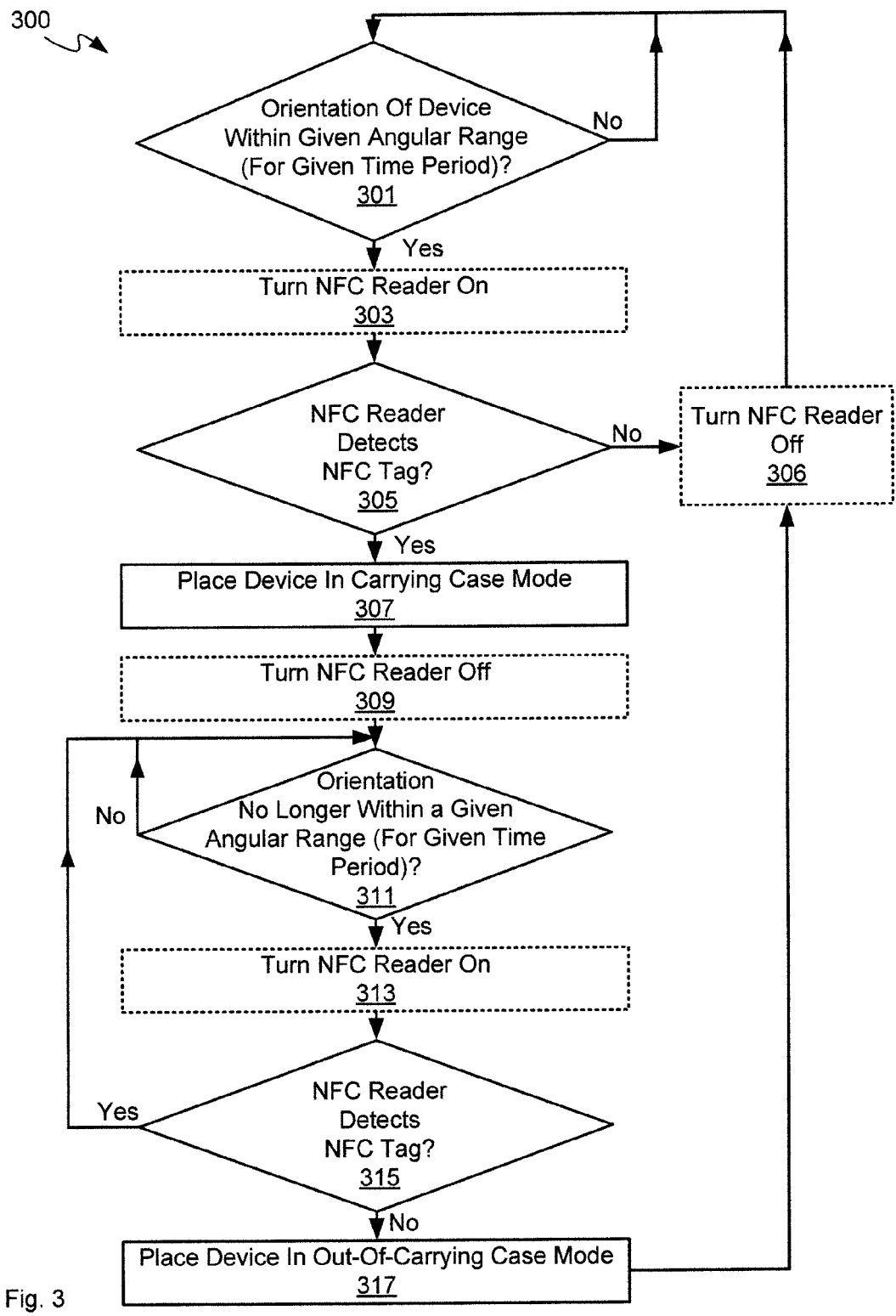
FIG. 3 depicts a method for placing the device of FIG. 1 into a carrying case mode, according to non-limiting implementations.

Attention is now directed to FIG. 3 which depicts a flowchart illustrating a method 300 for placing a device into a carrying case mode, according to non-limiting implementations. In order to assist in the explanation of method 300, it will be assumed that method 300 is performed using system 100 and specifically device 101. Furthermore, the following discussion of method 300 will lead to a further understanding of system 100 and device 101 and its various components. However, it is to be understood that system 100, device 101 and/or method 300 can be varied, and need not work exactly as discussed herein in conjunction with each other, and that such variations are within the scope of present implementations. It is appreciated that, in some implementations, method 300 is implemented in device 101 by processor 120, for example by implementing application 145.

It is to be emphasized, however, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood that method 300 can be implemented on variations of device 101 as well.

At block 301, processor 120 determines whether an orientation of device 101 is within a given angular range using orientation sensor 135. For example, the given angular range can be one or more of: between about 70° and about 110°; between about −20° and about 20°; indicative of a horizontal orientation; and, indicative of a vertical orientation. In other words, the given angular range can be generally indicative of device 101 being about vertical and/or device 101 being about horizontal. This reflects how devices are generally stored and/or carried in carrying cases: vertically clipped to a belt, clothing, a backpack and the like and/or horizontally laid on a surface. However, other orientations of device 101 are within the scope of present implementations; indeed, in some implementations, the given angular range can be configured at device 101 to better reflect how a given user might store and/or carry device 101 in carrying case 103. Further, the angular range can be defined with reference coordinate system 202: for example the angular range can be defined with reference to one or more of the x-direction and the y-direction. Further, the term "horizontal" can include orientations that are strictly horizontal as well as approximately horizontal or about horizontal or substantially horizontal. Similarly, the term "vertical" can include orientations that are strictly vertical as well as approximately vertical or about vertical or substantially vertical. Further, angular range values can be exact values or approximate values. Hence, angular ranges provided can be exact angular ranges or approximate angular ranges.

The given angular range can further reflect whether device 101 is stored in a portrait orientation or a landscape orientation (as depicted in FIG. 2) in carrying case 103.

In any event, when the orientation of device 101 is not within the given angular range (i.e. a "No" decision at block 301), block 301 can repeat periodically until processor 120 determines that the orientation of device 101 is within a given angular range using orientation sensor 135 (i.e. a "Yes" decision at block 301).

In some optional implementations, at block 301, processor 120 determines whether an orientation of device 101 is within a given angular range for a given time period, for example, on the order of a few seconds, about 10 seconds or so, and/or a time period indicative of a rest state of device 101 received within carrying case 103. Furthermore, the term "given time period" is appreciated to refer to a particular time period and/or a time period of significance; the given time period is also generally predetermined and/or configured at device 101 by storing the given time period at memory 122 either within application 145 and/or separate from application 145. In other words, as device 101 is moved about outside of carrying case 103, device 101 can undergo many different changes in orientation that can include orientations that are within the given angular range. However, when device 101 is received within carrying case 103, the orientation tends to stay constant, at least for a given time period, for example while carrying case 103 is clipped to a belt, and the like, and/or while carrying case 103 is laid on a horizontal surface, for example along the x-direction of coordinate system 202. The given time period can hence be chosen empirically to reflect these situations to prevent false positives at block 301. While not depicted, device 101 can further comprise a timing device, which can include, but is not limited to a clock, a digital clock, a timer, a digital timer, and the like to assist in determining when the orientation of device 101 is within a given angular range for the given time period.

When a "Yes" decision occurs at block 301 (i.e. orientation of device 101 is within a given angular range, and optionally for a given time period), optional block 303 can be implemented, and processor 120 can turn NFC reader 125 on, for example when NFC reader 125 is currently off. Some NFC readers 125 can be quite power hungry; hence it is beneficial to leave NFC reader 125 off until ready for use to preserve battery life at device 101. Hence, processor 120 can be optionally further configured to turn on NFC reader 125 when the orientation of device 101 is within the given angular range for a given time period.

At block 305, processor 120 determines whether NFC reader 125 detects NFC tag 155. When processor 120 determines that NFC reader 125 does not detect NFC tag 155 (i.e. a "No" decision at block 305), at optional block 306 processor 120 can turn NFC reader 125 off, and block 301 is again implemented, for example periodically.

However, at block 305, when processor 120 determines that NFC reader 125 detects NFC tag 155 (i.e. a "Yes" decision at block 305), at block 307, processor 120 places device 101 in a carrying case mode, as described above. In other words, processor 120 is configured to place device 101 in a carrying case mode when: an orientation of device 101 is within a given angular range as determined using orientation sensor 135, and NFC reader 125 detects NFC tag 155. Processor 120 can be further configured to place device 101 in a carrying case mode when: an orientation of device 101 is within a given angular range for a given time period, and NFC reader 125 detects NFC tag 155.

In other words, processor 120 generally determines that device 101 has been received in a carrying case and/or mated with a carrying case when: an orientation of device 101 is within a given angular range as determined using orientation sensor 135, and NFC reader 125 detects NFC tag 155; and/or when: an orientation of device 101 is within a given angular range for a given time period, and NFC reader 125 detects NFC tag 155.

In some implementations block 305 can comprise NFC reader 125 exchanging handshaking data with NFC tag 155, and NFC tag 155 can be detected by virtue of successful handshaking.

In other implementations, block 305 can further comprise receiving information 157 at processor 120 via NFC reader 125, and NFC tag 155 can be detected by virtue of receiving information 157.

In some of these implementations, a "Yes" decision only occurs at block 305 when information 157 matches information stored at memory 122 to prevent false positives. For example, in some situations, an orientation of device 101 can be within the given angular range and NFC reader 125 can detect an NFC tag that is not NFC tag 155 (for example an NFC tag on items for sale in a store), which could cause device 101 to be placed in the carrying case mode, at least temporarily, when device 101 is not received within carrying case 103. Hence, to prevent this, an additional check can be performed to compare information 157 with information stored at memory 122, the information stored at memory 122 similar, and/or about equivalent to, information 157. In these implementations, memory 122 can be configured with information similar, and/or about equivalent to, information 157 at one or more of at a factory, when application 145 is installed, when device 101 is first received in carrying case 103, and the like.

Furthermore, memory 122 can be configured with a plurality of information that is similar, and/or equivalent to information stored on NFC tags of a plurality of carrying cases with which device 101 can be mated, such that processor 120 can determine that device 101 is mated with a carrying case when: an orientation of device 101 is within a given angular range as determined using orientation sensor 135, and NFC reader 125 detects an NFC tag storing first information that about matches second information stored in memory 122. The information stored at memory 122 can identify one or more of given carrying cases, given classes of carrying cases and given types of carrying cases.

In yet further implementations, block 307 can further include processor 120 receiving information 157 from NFC tag 155 using NFC reader 125; and, configuring the carrying case mode based on information 157. For example, the carrying case mode can comprise a peek mode, as described in co-pending U.S. application Ser. No. 13/391,420, entitled "A DEVICE FOR PROVIDING NOTIFICATIONS WHILE MATED WITH A CARRYING CASE", where a portion of display 126 that is not obscured by a carrying case can be turned on when a device is received in a carrying case and the carrying case is in an open configuration. In these implementations, information 157 can be used to determine what portion of display 126 to turn on in the carrying case mode, presuming that device 101 is further configured to determine when carrying case 103 is in an open configuration (i.e. flap 203 is in an open configuration). Co-pending U.S. application Ser. No. 13/391,420, entitled "A DEVICE FOR PROVIDING NOTIFICATIONS WHILE MATED WITH A CARRYING CASE", further describes carrying cases with slider portions for peeking at a device mated therewith; such carrying cases are within the scope of present implementations and can be configured without magnets and with NFC tags as described herein.

In any event, at optional block 309 (which can be implemented before or after block 307, but after block 305, and/or in parallel with block 307), processor 120 can turn NFC reader 125 off to preserve battery life at device 101.

At block 311, processor 120 determines whether the orientation of device 101 is no longer within the given angular range, and optionally whether the orientation of device 101 is no longer within the given angular range for a given time period, which can be the same or different as the given time period described above with respect to block 301. Block 311 is otherwise similar to block 301 described above.

When the orientation of device 101 is still within the given angular range (i.e. a "No" decision at block 311), block 311 is repeated, for example periodically. In other words, after device 101 is placed in the carrying case mode, processor 120 can periodically determine whether the orientation of device 101 is still within the given angular range, and, optionally, for a given time period.

When the orientation of device 101 is no longer within the given angular range (i.e. a "Yes" decision at block 311), and optionally no longer within the given angular range for a given time period, at optional block 313 processor 120 can turn NFC reader 125 on (i.e. when NFC reader 125 is off) and at block 315 processor 120 determines whether NFC reader 125 detects NFC tag 155. Block 315 is otherwise similar to block 305 described above.

At block 315, when NFC reader 125 detects NFC tag 155 and/or continues to detect NFC tag 155 (i.e. a "Yes" decision at block 315), block 311 is implemented and/or is repeated periodically as described above. However, at block 315, when NFC reader 125 does not detect NFC tag 155 and/or no longer detects NFC tag 155 (i.e. a "No" decision at block 315), at block 317, processor 120 places device 101 in an out-of-carrying-case mode. The out-of-carrying-case mode can include, but is not limited to, a normal mode, a wake mode, and the like in which display 126 and the like are controlled to provide notifications assuming that display 126 is not obscured by carrying case 103; hence no specific restrictions, with regard to carrying case 103 obscuring display 126, are placed on where to provide notifications on display 126, for example when providing notifications of events, including, but not limited to, receipt of a message (e.g. emails, text messages etc.), receipt of a phone call, a calendar event and/or a calendar event reminder as indicated in, for example, a calendar database, and the like. In general, an out-of-carrying case-mode refers to the way or ways in which device 101 behaves or operates or responds or otherwise functions when it is out of (and/or not mated with) a carrying case, such as carrying case 103, as opposed to the way in which device 101 functions when device 101 is in a carrying case. When device 101 is removed from a carrying case, device 101 can automatically turn on or increase some of its own functionality, for example. Device 101 may also activate or change other functionality. Indeed, as described earlier, this is in contrast to when device 101 is in carrying case 103 and notifications can be restricted to notifications that are not obscured by carrying case 103.

Hence, processor 120 can be further configured to place device 101 in an out-of-carrying-case mode when: the orientation of device 101 is no longer within the given angular range as determined using orientation sensor 135, and NFC reader 125 no longer detects NFC tag 155. Processor 120 can be optionally further configured to place device 101 in the out-of-carrying-case mode when: the orientation of device 101 is no longer within the given angular range for a given time period, and NFC reader 125 no longer detects NFC tag 155.

Block 306 can be repeated before block 317 (but after block 315), after block 317 and/or in parallel with block 317 to turn off NFC reader 125. Block 301 can be implemented again to again determine when an orientation of device 101 is again within the given angular range.

Figure 4:
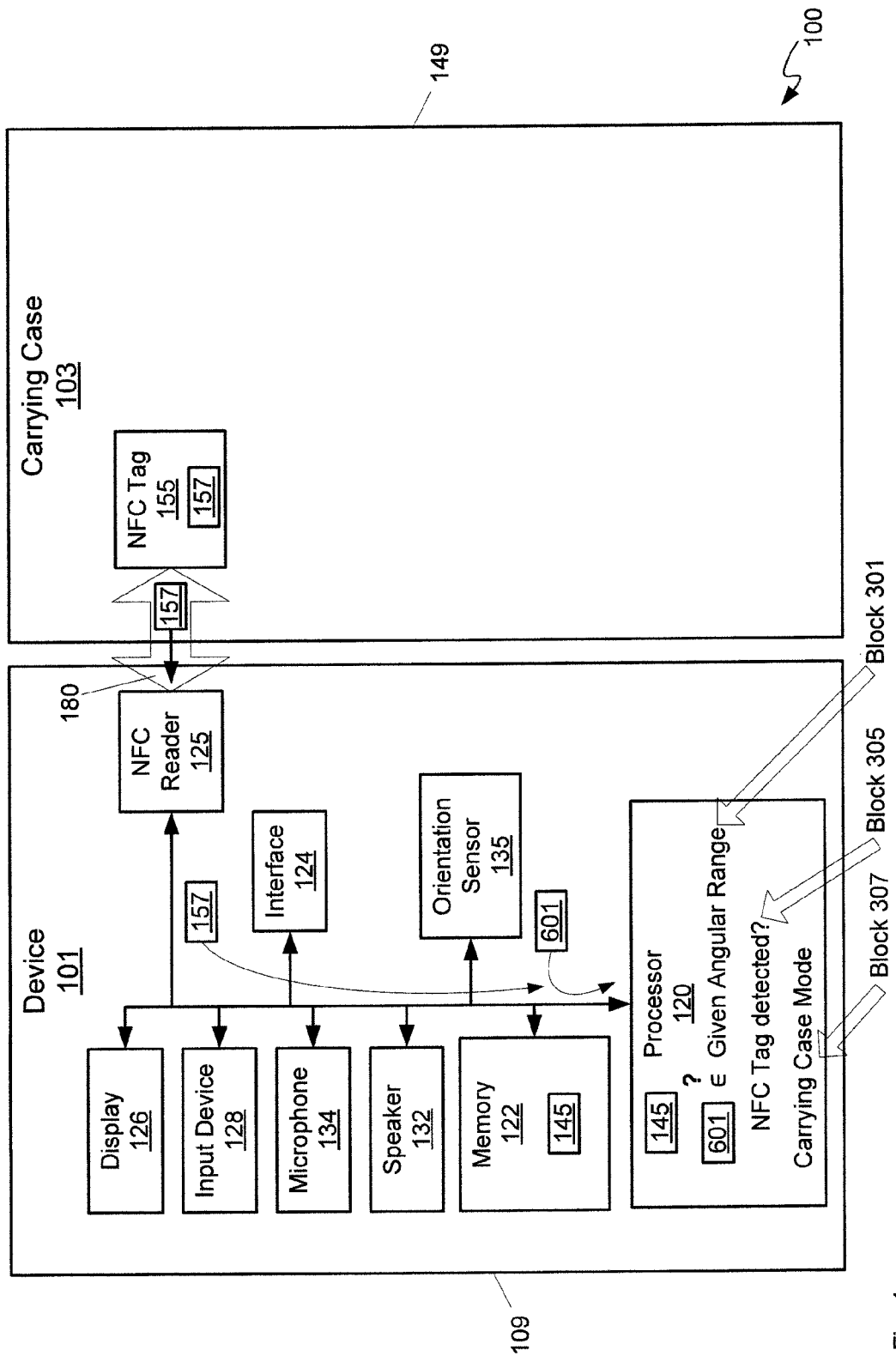
FIG. 4 depicts the device of FIG. 1 implementing the method of FIG. 3, according to non-limiting implementations.

Attention is next directed to FIG. 4, which is substantially similar to FIG. 1, with like elements having like numbers, and depicts implementations of blocks 301 to 307 of method 300 at processor 120 of device 101. As appreciated from FIG. 4, processor 120 can receive data 601 from orientation sensor 135, data 601 indicative of an orientation of device 101. At block 301, processor 120 can determine whether data 601 and/or an angle and/or an orientation corresponding to data 601 is within and/or an element of the given angular range. At block 305, processor 120 can receive information 157 from NFC reader 125, which in turn receives information 157 from NFC tag 155 using signals 180, and responsively determines that NFC reader 125 has detected NFC tag 155; processor 120 can optionally compare information 157 to information stored at memory 122 to assist in the determination at block 305, as described above. Alternatively, successful handshaking between NFC reader 125 and NFC tag 155 can indicate detection of NFC tag 155. When the conditions at blocks 301 and 305 are met, processor 120 can place device 101 into the carrying case mode at block 307. Placing device 101 into the carrying case mode can include, but is not limited to, turning NFC reader 125 off, turning display 126 off, turning at least a portion of display 126 off, turning microphone 134 off, turning input device 128 off, and the like. In other words, to place device 101 in the carrying case mode, processor 120 can turn off at least some components of device 101, for example, and optionally turn on other components of device 101.

While not depicted in FIG. 4, when the conditions at blocks 311 and 315 are met, processor 120 can place device 101 into the out-of-carrying-case mode at block 317. Placing device 101 into the out-of-carrying-case mode can include, but is not limited to, turning NFC reader 125 off, turning display 126 on, turning at least a portion of display 126 on, turning microphone 134 on, turning input device 128 on, and the like. In other words, to place device 101 in the carrying case mode, processor 120 can turn on at least some components of device 101 and optionally turn off other components of device 101.

Persons skilled in the art will appreciate that there are yet more alternative implementations and modifications possible. For example, in some implementations, NFC reader 125 can be on prior to block 301 being implemented, and hence block 305 can be implemented prior to block 301 and/or in parallel with block 301. Similarly NFC reader 125 can be on prior to block 311 being implemented, and hence block 315 can be implemented prior to block 311 and/or in parallel with block 311. For example, NFC reader 125 can be always on; however this can cause battery life to rapidly deteriorate. Alternatively, NFC reader 125 can be turned on periodically to determine whether NFC reader 125 can detect NFC tag 155; when so, blocks 301, 305 can be implemented in any order. Similarly, once device 101 is in the carrying case mode, NFC reader 125 can be turned on periodically to determine whether NFC reader 125 can detect NFC tag 155; when so, blocks 311, 315 can be implemented in any order.

It is further appreciated that while carrying case 103 depicted in FIG. 2 is configured to receive device 101 in a landscape orientation (e.g. sideways), present implementations are not so limiting and other carrying cases in present implementations can be configured to receive device 101 in a portrait orientation, and/or any other orientation. Further, while carrying case 103 receives device 101 via an opening in a top side, carrying cases in other implementations can receive device 101 in any manner. Further, while carrying case 103 depicted in FIG. 2 comprises flap 203 that can be used for one or more of placing carrying case 103 into an open configuration and a closed configuration and peeking at display 126, in other implementations, for example as described in co-pending U.S. application Ser. No. 13/391,420, entitled "A DEVICE FOR PROVIDING NOTIFICATIONS WHILE MATED WITH A CARRYING CASE", carrying cases can comprise a sliding portion for one or more of placing the carrying case into an open configuration and a closed configuration and peeking at display 126. Indeed, type and/or class of carrying case where magnets can be eliminated and replaced with an NFC tag that can be detected by devices received therein are within the scope of present implementations.

While it is appreciated that the methods described herein could also be used with non-portable devices, the methods may be especially advantageous for mobile electronic devices that are handheld. Implementation of one or more embodiments may realize one or more additional benefits as well, such as flexibility of implementation. Further, this disclosure can be adapted to a variety of mobile electronic devices, a variety of carrying cases and/or holsters, and a variety of bodies, including, but not limited to, carrying cases open configurations and closed configurations.

Hence, provided herein are various implementations of devices that can be used to detect whether the device is mated with a carrying case when the carrying case does not comprise a magnet.

It is further appreciated that carrying cases described herein provide a convenient receptacle for holding/interacting with a device, while simultaneously providing a mechanism to enable a device to detect when the device is mated with the carrying case. The mechanism further eliminates magnets from the carrying case which generally reduces a cost of the carrying case and further is more environmentally friendly than using magnets. Further advantages of devices described herein include, but are not limited to: versatility in alerting a device that the device is mated with a carrying case, adaptability to a variety of devices, combined functionality of a mechanism for assisting a device in determining when mated therewith and a physical protector, compactness, light weight (such that the carrying case is portable, thereby supporting handheld implementations and aiding mobility and portability; further, eliminating magnets reduces a weight of a carrying case), efficiency, robustness, and enhancing the functionality of a device mated thereto without detracting from other functions of the device.

Some of the apparatus and techniques described herein can be applicable to things other than devices relating to carrying cases. For example, determining three-dimensional orientation of a portable device in general (or a handheld device in particular) can be useful for various applications pertaining to photography or virtual reality or gaming, for example. Hence, there is a potential benefit in that some of the components may be useful for multiple functions or operations or applications, depending on the three-dimensional orientation of the device. A further potential benefit can be that, although the described concepts support eliminating magnets, the concepts may operate even if one or more magnets are present, and can work as a replacement for, or in concert with, magnets.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

The invention claimed is:
1. A device comprising:
an orientation sensor;
a near field communication (NFC) reader that is initially off; and,
a processor configured to:
in response to determining, using the orientation sensor, that an orientation of the device is within a given angular range:
turn the NFC reader on; and,
when the NFC reader detects an NFC tag:
place the device into a carrying-case mode, the carrying-case mode comprising one or more of a sleep mode, a quiet mode and a peek mode; and, turn the NFC reader off; and,
after the determining that the orientation of the device is within the given angular range and turning the NFC reader off, determine, using the orientation sensor, that the orientation of the device is no longer within the given angular range; and, in response:
turn the NFC reader back on; and,
when the NFC reader no longer detects the NFC tag:
place the device into an out-of-carrying-case mode, the out-of-carrying-case mode comprising one or more of a normal mode, a wake mode; and, turn the NFC reader back off.

2. The device of claim 1, wherein the processor is further configured to place the device in the carrying-case mode when: the orientation of the device is within the given angular range for a given time period, and the NFC reader detects the NFC tag after the NFC reader is turned on.

3. The device of claim 1, wherein the processor is further configured to: receive information from the NFC tag using the NFC reader after the NFC reader is turned on; and, configure the carrying-case mode based on the information.

4. The device of claim 1, wherein the processor is further configured to place the device in the out-of-carrying-case mode when: the orientation of the device is no longer within the given angular range for a given time period, and the NFC reader no longer detects the NFC tag after the NFC reader is turned back on.

5. The device of claim 1, wherein the given angular range is one or more of: between 70° and 110°; between −20° and 20°; indicative of a horizontal orientation; and indicative of a vertical orientation.

6. The device of claim 1, wherein the orientation sensor comprises one or more of a gyroscope, an accelerometer, and a magnetometer.

7. A method comprising:
at a device comprising an orientation sensor, a near field communication (NFC) reader that is initially off, and a processor, in response to determining, using the orientation sensor, that an orientation of the device is within a given angular range:
turn the NFC reader on; and,
when the NFC reader detects an NFC tag:
place the device into a carrying-case mode, the carrying-case mode comprising one or more of a sleep mode, a quiet mode and a peek mode; and,
turn the NFC reader off; and,
after the determining that the orientation of the device is within the given angular range and turning the NFC reader off, determining, using the orientation sensor, that the orientation of the device is no longer within the given angular range; and, in response:
turn the NFC reader back on; and
when the NFC reader no longer detects the NFC tag:
place the device into an out-of-carrying-case mode, the out-of carrying-case mode comprising one or more of a normal mode, a wake mode; and,
turn the NFC reader back off.

8. The method of claim 7, further comprising placing, using the processor, the device in the carrying-case mode when: the orientation of the device is within the given angular range for a given time period, and the NFC reader detects the NFC tag after the NFC reader is turned on.

9. The method of claim 7, further comprising: receiving information at the processor from the NFC tag using the NFC reader after the NFC reader is turned on; and, configuring, using the processor, the carrying-case mode based on the information.

10. The method of claim 7, further comprising placing, using the processor, the device in the out-of-carrying-case mode when: the orientation of the device is no longer within the given angular range for a given time period, and the NFC reader no longer detects the NFC tag after the NFC reader is turned back on.

11. The method of claim 7, wherein the given angular range is one or more of: between 70° and 110°; between −20° and 20°; indicative of a horizontal orientation; and indicative of a vertical orientation.

12. The method of claim 7, wherein the orientation sensor comprises one or more of a gyroscope, an accelerometer, and a magnetometer.

13. A non-transitory computer-readable medium storing a computer program, wherein execution of the computer program is for:
at a device comprising an orientation sensor, a near field communication (NFC) reader that is initially off, and a processor, in response to determining, using the orientation sensor, that an orientation of the device is within a given angular range:
turn the NFC reader on; and,
when the NFC reader detects an NFC tag:
place the device into a carrying-case mode, the carrying-case mode comprising one or more of a sleep mode, a quiet mode and a peek mode; and,
turn the NFC reader off; and,
after the determining that the orientation of the device is within the given angular range and turning the NFC reader off, determining, using the orientation sensor, that the orientation of the device is no longer within the given angular range; and, in response:
turn the NFC reader back on; and
when the NFC reader no longer detects the NFC tag:
place the device into an out-of-carrying-case mode, the out-of carrying-case mode comprising one or more of a normal mode, a wake mode; and,
turn the NFC reader back off.

14. The non-transitory computer-readable medium of claim 13, wherein execution of the computer program is further for: placing, using the processor, the device in the carrying-case mode when: the orientation of the device is within the given angular range for a given time period, and the NFC reader detects the NFC tag after the NFC reader is turned on.

* * * * *